(12) United States Patent
Nakayama et al.

(10) Patent No.: US 6,404,465 B1
(45) Date of Patent: Jun. 11, 2002

(54) LIQUID CRYSTAL DISPLAY WHEREIN STORAGE ELECTRODES OVERLAP UPPER PART OF SOURCE LINES AND PIXEL ELECTRODES OVERLAP UPPER PART OF STORAGE ELECTRODES

(75) Inventors: Akio Nakayama; Yoshinori Numano, both of Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 09/395,940

(22) Filed: Sep. 14, 1999

(30) Foreign Application Priority Data

Sep. 21, 1998 (JP) ............................................ 10-265980
Dec. 7, 1998 (JP) ............................................ 10-347617

(51) Int. Cl.[7] ..................... G02F 1/1343; G02F 1/136
(52) U.S. Cl. ........................ 349/39; 349/38; 349/42
(58) Field of Search ........................... 349/39, 38, 42

(56) References Cited

U.S. PATENT DOCUMENTS

| | | | | |
|---|---|---|---|---|
| 5,151,806 A | * | 9/1992 | Kawamoto et al. | 359/59 |
| 5,212,574 A | * | 5/1993 | Katayama et al. | 359/59 |
| 5,663,575 A | * | 9/1997 | Yamamura et al. | 257/59 |
| 5,672,891 A | * | 9/1997 | Hamamoto et al. | 257/301 |
| 5,760,854 A | * | 6/1998 | Ono et al. | 349/38 |
| 5,955,744 A | * | 9/1999 | Gu et al. | 257/59 |
| 6,008,869 A | * | 12/1999 | Oana et al. | 349/43 |
| 6,023,074 A | * | 2/2000 | Zhang | 257/59 |

FOREIGN PATENT DOCUMENTS

| | | |
|---|---|---|
| JP | 3-288824 | 12/1991 |
| JP | 6-308533 | 11/1994 |

* cited by examiner

Primary Examiner—William L. Sikes
Assistant Examiner—Tarifur R. Chowdhury
(74) Attorney, Agent, or Firm—McDermott, Will & Emery

(57) ABSTRACT

Parasitic capacity between Cs lines and source lines forming a pixel section is reduced, whereby characteristic resistant to crosstalk is achieved, aperture ratio is increased, and brightness of LCD is increased. The Cs lines are arranged on the source lines in such a manner as to cover the source lines, and pixel electrodes are arranged and formed on the Cs lines in such a manner as to partially overlap. By forming a structure in which the source lines, the Cs lines and the pixel electrodes are laminated in order, parasitic capacity between the Cs lines and the source lines forming a pixel section can be reduced, and crosstalk can be minimized. As a distance between the source lines and the pixel electrodes can be reduced from the viewpoint of a plan view, aperture ratio can be improved.

6 Claims, 20 Drawing Sheets

US 6,404,465 B1

LIQUID CRYSTAL DISPLAY WHEREIN STORAGE ELECTRODES OVERLAP UPPER PART OF SOURCE LINES AND PIXEL ELECTRODES OVERLAP UPPER PART OF STORAGE ELECTRODES

BACKGROUND OF THE INVENTION

1. Field of the Invention

The present invention relates to a liquid crystal display provided with a thin film transistor array substrate for use in matrix type display and to a manufacturing method thereof.

2. Description of the Prior Art

Generally, a matrix type display comprises a thin film transistor array substrate (hereinafter referred to as TFT array substrate) on which a thin film transistor (hereinafter referred to as TFT) is formed, and a counter substrate on which color filter, black matrix, etc. are formed. A display material such as liquid crystal is held between the mentioned two substrates, and in which a voltage is selectively applied to the display material.

In the TFT array substrate, as shown in the equivalent circuit of FIG. 14, pixels are arranged forming a matrix.

In FIG. 14, reference numerals G1, G2, G3 indicate scanning signal lines (hereinafter referred to as gate lines), and numerals S1, S2, S3 indicate image signal lines (hereinafter referred to as source lines). Cs1, Cs2, Cs3 indicate storage capacitance electrode lines for forming a storage capacitance (hereinafter referred to as Cs lines).

Further, numerals 1a to 1i indicate TFT(s), and charge and discharge of an electric charge to and from a pixel electrode is controlled using the TFT(s) as switching element(s). Numerals 2a to 2i are storage capacitances which are prepared by forming an insulating film between the pixel electrode and the Cs lines. The pixel electrode is formed to be a transparent electrode such as ITO, and forms liquid crystal capacities 3a to 3i holding a liquid crystal between itself and the counter electrode. Numerals 4a to 4i are parasitic capacities Cdp formed parasitically between the source lines and the pixel electrode. On/Off operation of the TFT is performed using the gate lines as gate electrodes.

The pixel electrode is connected to the source line through the TFT, and amount of electric charge given to the pixel electrode varies depending on signal level of the source line, whereby a potential of the pixel electrode is established. In response to a voltage between the pixel electrode and the counter electrode, amount of displacement of liquid crystal varies, and amount of a transmitted light through the backside is changed. Accordingly, by controlling the signal level of the source line, optical signal change is restrained and displayed in the form of an image.

To improve image quality, it is necessary to reduce as small as possible variation in pixel potential due to change in signal level of the gate line, etc. For that purpose, total capacity of the pixel is increased by providing the pixel electrode with the storage capacitances 2a to 2i. The storage capacitances 2a to 2i are formed by providing an insulating film between the Cs lines Cs1 to Cs3 of the same potential as that of the counter electrode and the pixel electrode.

FIG. 15 shows a pixel layout in the conventional TFT array substrate. FIG. 16 shows a sectional view of a region A—A of FIG. 15 taken in the direction of the arrows. FIGS. 17 and 18 show a conventional method of forming a pixel section taking the sectional view of the A—A region as an example.

In FIG. 15, reference numeral 102 indicates a gate line, numeral 104 indicates a semiconductor thin film, numeral 107 is a source line, numeral 108 is a source electrode, numeral 109 is a drain electrode, numeral 111 is a Cs line, and numeral 114 is a pixel electrode.

In FIG. 16, reference numeral 101 indicates a glass substrate, and numeral 103 indicates a gate insulating film, numeral 105 is an i-layer (a semiconductor layer composed of non-doped amorphous silicon, etc.). Numeral 106 is a n-layer (for example, a semiconductor layer composed of amorphous silicon, etc. containing n-type impurity), and numeral 113 is an insulating film. Same reference numerals as those given for the above description are designated to the same or like parts.

A manufacturing process of the matrix type display having a sectional structure as shown in FIG. 16 is hereinafter described with reference to FIGS. 17 and 18.

First, as shown in FIG. 17(a), a metal film 102a to serve as the gate electrode 102 is formed on the glass substrate 101, and then, as shown in FIG. 17(b), a resist pattern 110a having a planar shape corresponding to the gate electrode 102 is formed thereon. Using the resist pattern 110a as an etching mask, an etching is applied to the metal film 102a, thus the gate electrode 102 is obtained, and then the resist pattern 110a is removed.

Then, as shown in FIG. 17(c), the gate insulating film 103, i-layer 105, and n-layer 106 are laminated in order, and as shown in FIG. 17(d), a resist pattern 110b is formed on the region where the i-layer 105 and the n-layer 106 are left, and using the resist pattern 110b as an etching mask, the n-layer 106 and the i-layer 105 are etched in order. The resist pattern 110b is then removed.

Subsequently, as shown in FIG. 17(e), an ITO thin film 114a to serve as the pixel electrode 114 is further placed, and as shown in FIG. 18(a), using a resist pattern 110c patterned into a shape corresponding to the pixel electrode 114 as an etching mask, the pixel electrode 114 is obtained by etching the ITO thin film 114a. The resist pattern 110c is then removed.

Then, as shown in FIG. 18(b), a metal film 112a to serve as source line 107, source electrode 108, and drain electrode 109 is placed. And as shown in FIG. 18(c), a resist pattern 110d corresponding to a region required to serve as source line 107, source electrode 108 and drain electrode 109, is patterned. Using the resist pattern 110d as an etching mask, the metal film 112a is etched, then the resist pattern 110d is removed, whereby the insulating film 113 is formed. As a result, a conventional matrix type display of the sectional structure shown in FIG. 16 is obtained.

Then, structure and function of the conventional TFT is hereinafter described. With reference to the mentioned FIG. 16, when the pixel electrode 114 is charged with an electric charge, a voltage of about 9V is applied to the source electrode 108, and a positive voltage of about 20V is applied to the gate. electrode 102, whereby the TFT is turned on, and the drain electrode 109 and the pixel electrode 114 are charged approximately to 9V.

Thereafter, when potential of the pixel electrode 114 has sufficiently increased, a negative voltage of about −5V is applied to the gate electrode 102, whereby the TFT is turned off, and the electric charge is constrained in the pixel.

In the conventional pixel structure described above, the pixel electrode 114 is connected to the source line 107 through the TFT, and potential of the pixel electrode 114 is established depending on signal level of the source line 107. In response to the voltage between the pixel electrode 114 and the counter electrode, amount of displacement of the liquid crystal varies and the transmitted light from the backside is changed.

Accordingly, by controlling signal level of the source line 107, optical signal change is controlled and displayed in the form of an image.

Maximum brightness of the liquid crystal display is determined by light transmittance (transmissivity of light) in the mentioned pixel, and the light transmittance becomes higher when area of the part through which light is transmitted, i.e., aperture in the pixel is larger. To achieve a liquid crystal display of high brightness, it is necessary to increase the area of aperture occupied in the area of the entire pixel (hereinafter referred to as aperture ratio).

As a method for increasing the aperture ratio, it is useful to decrease the distance between the pixel electrode 114 and the source line 107 in FIG. 15. However, when decreasing the distance between the pixel electrode 114 and the source line 107, the parasitic capacity Cdp generated between the source line 107 and the pixel electrode 114 in FIG. 14 is increased.

Generally, when varying the source signal, the pixel potential is changed through the parasitic capacity Cdp. Variation in the pixel potential becomes larger, when the parasitic capacity Cdp is larger and variation in the source signal is larger. When the parasitic capacity Cdp becomes large, a problem of crosstalk occurs. This problem of crosstalk is hereinafter described with reference to FIG. 14. The crosstalk is a phenomenon that, when amplitude of the source signal is increased only for writing data in the pixel (liquid crystal capacity 3a) and amplitude of the source signal is decreased for writing data in the other pixels (liquid crystal capacities 3b to 3i), potential of the pixel having liquid crystal capacities 3d, 3g on the source line S1 is changed by the increased source signal amplitude for writing data in the pixel and having the liquid crystal capacity 3d, and the pixel potential is different from the adjacent pixel having liquid crystal capacities 3e, 3h.

In this crosstalk, the pixels other than that having the liquid crystal capacity 3a should be of same display data and same brightness, but there arises a difference in brightness between the pixel on the source line S1 and the pixels on the source lines S2, S3. In other words, there arises a problem that, as the crosstalk occurs when decreasing the distance between the pixel electrode 114 and the source line 107, it is necessary to secure a distance exceeding a certain value between the pixel electrode and the source line. As a result, aperture ratio of the liquid crystal display cannot be increased.

The Japanese Laid-Open Patent Publication (unexamined) 288824/1991 disclosed one of the prior arts. This patent publication shows a liquid crystal display in which a line corresponding to the Cs line and the pixel electrode are partially overlapped.

As discussed above, in the pixel structure of the conventional TFT array substrate, there is a problem that when decreasing the distance between the pixel electrode and the source line to improve the aperture ratio, the parasitic capacity Cdp is increased, eventually resulting in occurrence of crosstalk.

Further, in the array substrate of the conventional active matrix type liquid crystal display, to form an array, a plurality of gate lines are arranged in row and a plurality of source lines are arranged in train on an insulating substrate. Further, a TFT and one pixel composed of a pixel electrode connected to the TFT are formed at a crossover position of each gate line and each source line, and an orientation film is formed thereon.

On the other hand, in the counter substrate being another substrate for holding the liquid crystal, a common electrode is formed on the insulating substrate, and an orientation film is formed thereon. Surfaces of the array substrate and the counter substrate on which the pixel electrode and the common electrode are formed are put facing to each other, and a liquid crystal composite is held in a gap between the two substrates. Usually, as the orientation film is oriented in a direction displaced by 90 degrees between the array substrate side and the counter substrate side, a TN liquid crystal in which liquid crystal particles are arranged twisted by 90 degrees in the direction of thickness is used.

FIG. 19 is a plan view showing a pixel of another conventional TN type liquid crystal display disclosed in the Japanese Laid-Open Patent Publication (unexamined) 308533/1994.

In the drawing, reference numeral 201 indicates a source line, numeral 202 indicates a gate line arranged to crossover the source line 201, and numeral 203 is a Cs line forming a storage capacitance which is formed by the same process as the gate line 202. Numeral 204 is a semiconductor layer forming a channel of the TFT, numeral 205 is a pixel electrode, and numeral 206 is a drain electrode of the TFT connected to the pixel electrode 205. The TFT is formed of the semiconductor layer 204, source line 201, gate line 202 and drain electrode 206.

FIG. 20 is a schematic diagram showing a signal flow at the time of interrupting the Cs line of the pixel of the conventional liquid crystal display.

In the drawing, reference numeral 208 indicates a short circuit point between the gate line 202 and the Cs line 203. Numeral 209 is two interrupting points for interrupting the Cs line 203 on two sides of the short circuit point 208, and numeral 210 indicates a signal flow of the Cs line 203. Sn is a source line, Gk is a gate line, and Vcom is a potential of the common electrode of the counter substrate. Potential of the Cs line is equal to that of the common electrode.

Operation of the conventional liquid crystal display of above arrangement is hereinafter described.

When an on signal is applied to the gate line 202, the TFT is turned on, and a predetermined electric charge is written from the source line 201 in the storage capacitance and the capacity of liquid crystal (hereinafter referred to as Clc). Then, when the selective signal of the gate line 202 is turned off, the TFT is turned off (a high resistance state), and the electric charge written from the source line is held. An effective voltage determined by the difference between the potential determined by this electric charge and the potential of the common electrode of the counter substrate is applied to the liquid crystal, whereby a light transmittance in proportion to the effective voltage is obtained. As a result, a desired display is achieved.

At this time, when varying the selective signal of the gate line 202, potential of the drain electrode 206 is changed by a coupling capacity Cgd of the gate line 202 and the drain electrode 206. Supposing that the potential variation is $\Delta Vgd$, the $\Delta Vgd$ is shown in the following expression:

$$\Delta Vgd = (Cgd \times \Delta Vg)/(Cgd + Cs + Clc) \quad (1)$$

where: $\Delta Vg$ is a variation of potential when the signal from the gate line 202 is turned from on to off. Because of the variation $\Delta Vgd$ of the potential of the drain electrode 206, the central potential of the potential Vcom of the common electrode of the counter substrate and the central voltage of the voltage applied to the liquid crystal are displaced. It is well known that if the variation is large, there arises a flicker in image plane, and a phenomenon (hereinafter referred to printing) takes place in which when a pattern is continuously displayed for a long time, the same pattern still remains after being switched to the other pattern, which results in deterioration of display quality. To prevent such problem, it is necessary to add a predetermined storage capacitance in parallel to the liquid crystal capacity.

On the other hand, in the liquid crystal display, the light transmitted through the part other than the pixel electrode 205 brings about a disadvantage of deterioration of display quality such as lowering in contrast ratio. Accordingly, it is necessary to shade any leak of light transmitted through the part other than the pixel electrode 205. In the conventional liquid crystal display, leak of light from the gap between the pixel electrode 205 and the source line 201 is shaded by arranging the Cs line 203 in the periphery of the pixel electrode to form a shade film. In such a case, the Cs line 203 is located in the periphery of the pixel electrode along the source line 201, extending to the part near the gate line 202. In this respect, as compared with the case of forming a shade film on the array substrate, when shading the leak light by the shade film arranged on the counter substrate, alignment accuracy of the counter substrate and the array substrate is lower than the pattern accuracy of the array substrate, resulting in a large shading region. Accordingly, when the gap between the gate line 202 and the Cs line 203 serving as the shade film is formed as small as possible, the shading region by the shade film arranged on the counter substrate is reduced, and aperture ratio is improved.

In the conventional liquid crystal display of above arrangement, the Cs line 203 performs a function of shading the leak light out of the gap between the pixel electrode 205 and the source line 201, and the Cs line 203 is located near the gate line 202. Because the gate line 202 and the Cs line 203 are formed in the same process, there arises a defect of short circuit between the gate line 202 and the Cs line 203 due to defective pattern such as foreign matter stuck at the time of photomechanical process and etching. When occurs such a defect of short circuit, any scanning signal is not supplied normally, which is visually recognized as defective line. Such a defective line can be detected by the inspection after completing the manufacturing process of the array substrate, and it is possible to cut the defect with a laser or the like. However, in the event that such a defect of short circuit takes place under the source line 201, a problem exists in that when interrupting the short circuit portion, the source line 201 is also interrupted and visually recognized as defective source line, making it impossible to repair the defect.

Moreover, it is certainly possible to cut the Cs line 203 at the two interruption points 209 on both sides of the short circuit point 208 as shown in FIG. 20. But, in this case, the signal supplied to the Cs line 203 is supplied from one side of the image plane. For example, in the event of interrupting the Cs line 203 in response to a short circuit between the gate line 202 and the Cs line 203 near the right end of the image plane, the signal supplied to the Cs line 203 is supplied from the left end side of the image plane. Therefore, a load on the Cs line 203 is four times as much as the normal supply, and a signal delay occurs. Due to such a signal delay, brightness varies as compared with peripheral pixel, and the Cs line 203 is visually recognized as defective line that is another problem.

OBJECT OF THE INVENTION

Accordingly, an object of the present invention is to provide a TFT-LCD (LCD is an abbreviation of liquid crystal display) of high quality in which parasitic capacity Cdp hardly increases and crosstalk is small by arranging a pixel electrode on a source line through a Cs line.

Another object of the invention is to provide a TFT-LCD of high aperture ratio and high brightness by forming a pixel electrode extending to a source line through a Cs line.

A further object of the invention is to provide a liquid crystal display of high yield.

A still further object of the invention is to provide a manufacturing method of a liquid crystal display conforming to each of the foregoing objects.

SUMMARY OF THE INVENTION

A liquid crystal display according to the present invention comprises a TFT array substrate for use in matrix type display, the TFT array substrate including a plurality of gate lines arranged on an insulating substrate with certain distances, a plurality of source lines crossing over the gate lines, and TFT(s) provided at crossover sections between the gate lines and the source lines, and having pixel electrodes connected to drain electrodes forming the TFT(s), and Cs lines each forming a storage capacitance by holding an insulating film between the Cs lines and pixel electrodes, wherein the Cs lines are arranged and formed in such a manner as to overlap an upper part of the source lines.

In the liquid crystal display according to the invention, it is preferable that the Cs lines are formed into a mesh-like structure having line components in wiring direction of the source lines and the gate lines, in addition to the mentioned construction.

In the liquid crystal display according to the invention, it is preferable that the pixel electrodes are arranged and formed in such a manner as to overlap an upper layer of the Cs lines, in addition to the mentioned construction.

In the liquid crystal display according to the invention, it is preferable that the line component in wiring direction of the source lines is formed to be wider than the source lines in such a manner as to cover the source lines, in addition to the mentioned construction.

In the liquid crystal display according to the invention, it is preferable that the Cs lines are arranged in such a manner as to extend in one direction along the source lines and formed to be wider than the source lines in such a manner as to cover the source lines, and the pixel electrodes are arranged and formed in such a manner as to overlap the upper layer of the Cs lines, in addition to the mentioned construction.

In the liquid crystal display according to the invention, it is preferable that the pixel electrodes and the gate lines overlaps partially each other, in addition to the mentioned construction.

A manufacturing method of a liquid crystal display according to the invention comprises the steps of forming source lines, Cs lines and pixel electrodes in order, and arranging the source lines, Cs lines and the pixel electrodes in such a manner that they overlap partially one another.

A liquid crystal display according to the invention comprises pixel electrodes respectively formed in a plurality of matrix-like regions defined by a plurality of gate lines and a plurality of source lines arranged in such a manner as to cross over said gate lines, and Cs lines arranged in such a manner as to extend over the plurality of regions along the gate lines, wherein the Cs lines are arranged in such a manner that two Cs lines extend within each region, and the two Cs lines are connected to each other within a part of the regions.

In the liquid crystal display according to the invention, it is preferable that the Cs lines have a wiring section shaped to shade a leak light from between the pixel electrodes and the source lines.

In the liquid crystal display according to the invention, it is preferable that the Cs lines are connected through the wiring section in the region where the Cs lines are connected to each other.

In the liquid crystal display according to the invention, it is preferable that the two Cs lines are connected to each other at least within two regions.

In the liquid crystal display according to the invention, it is preferable that the regions in which the two Cs lines are connected to each other are arranged with equal distances.

In the liquid crystal display according to the invention, it is preferable that the gate lines and the Cs lines are formed into a same layer.

A manufacturing method of a liquid crystal display according to the invention comprises a first step of arranging Cs lines along gate lines in such a manner that two Cs lines extend within a region and forming the gate lines and the Cs lines in such a manner that the two Cs lines are connected to each other within a part of the regions, and a second step of forming source lines in such a manner as to cross over the gate lines through an insulating film.

In the manufacturing method of a liquid crystal display according to the invention, it is preferable that when a gate line and a Cs line short-circuits under a signal line, the Cs line is interrupted on two sides of the source line.

DESCRIPTION OF THE PREFERRED EMBODIMENT

Example 1

Example 1 of the invention is hereinafter described.

The invention is characterized by its structure in the pixel section of TFT array, and a difference from the prior art is hereinafter described with reference to the drawings.

In a liquid crystal display according to the invention, the Cs lines are formed on the upper layer of the source lines to cover them, and the pixel electrodes are further arranged and formed on the upper layer thereof in such a manner as to overlap partially.

Basic construction of the liquid crystal display is same as that according to the prior art.

Figure 1:
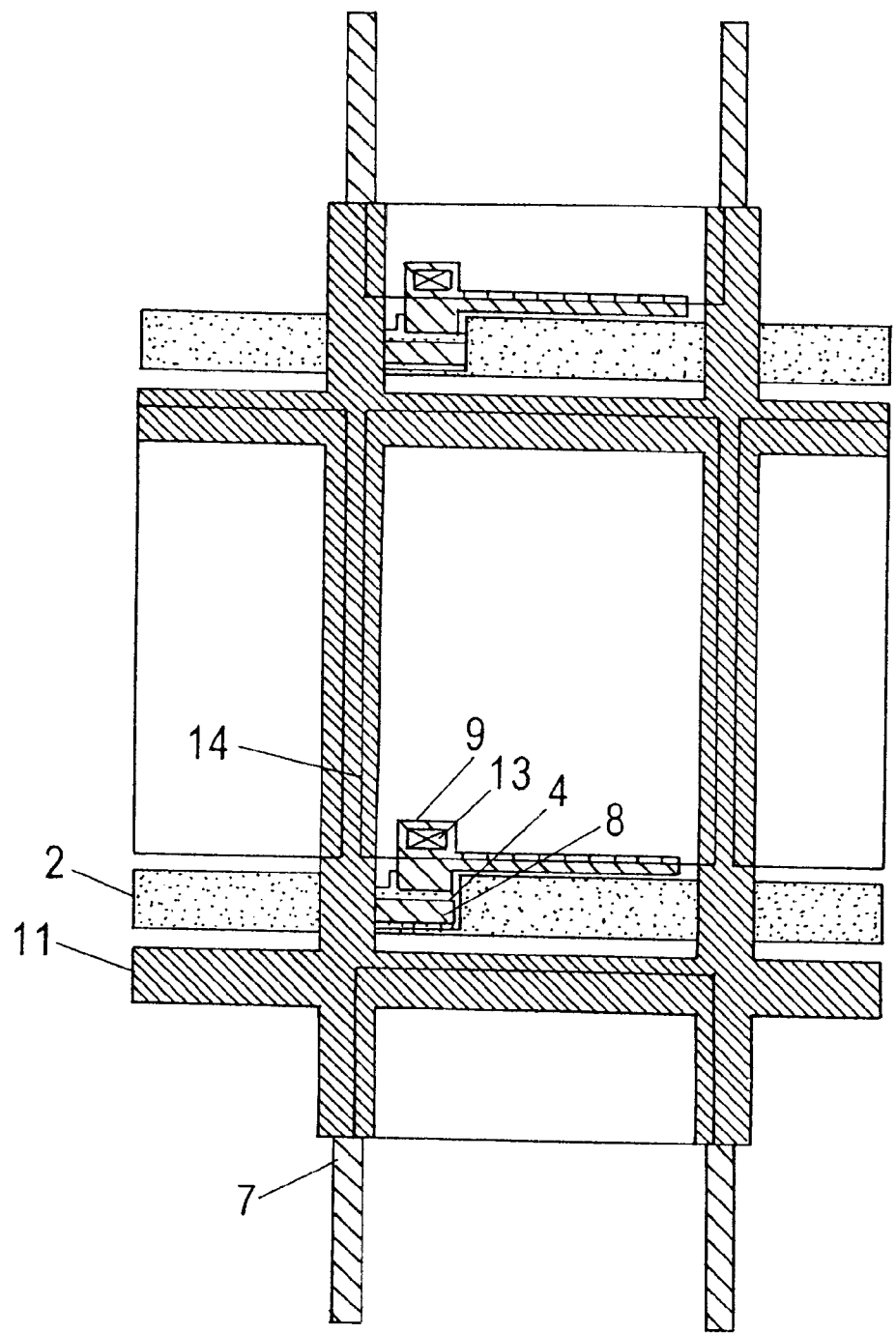
FIG. 1 is a plan view of a liquid crystal display according to example 1 of the present invention.

FIG. 1 is a plan view of a liquid crystal display according to example 1 of the invention. In the drawing, reference numeral 2 indicates a gate line, numeral 4 indicates a semiconductor thin film forming a TFT, numeral 7 is a source line, numeral 8 is a source electrode, numeral 9 is a drain electrode, numeral 11 is a Cs line, numeral 14 is a pixel electrode, and numeral 13 is a contact for electrically connecting the pixel electrode 14 and the drain electrode 9. The Cs line 11 is arranged on the source line 7 formed extending in longitudinal direction of FIG. 1 through an insulating film, and the source line 7 is covered by the Cs line 11. A part of the pixel electrode 14 is arranged on the Cs line 11 through the insulating film in such a manner as to overlap the source line 7.

A manufacturing method of the pixel section of the structure as shown in FIG. 1 is hereinafter described with reference to FIGS. 2 to 7.

Figure 2:
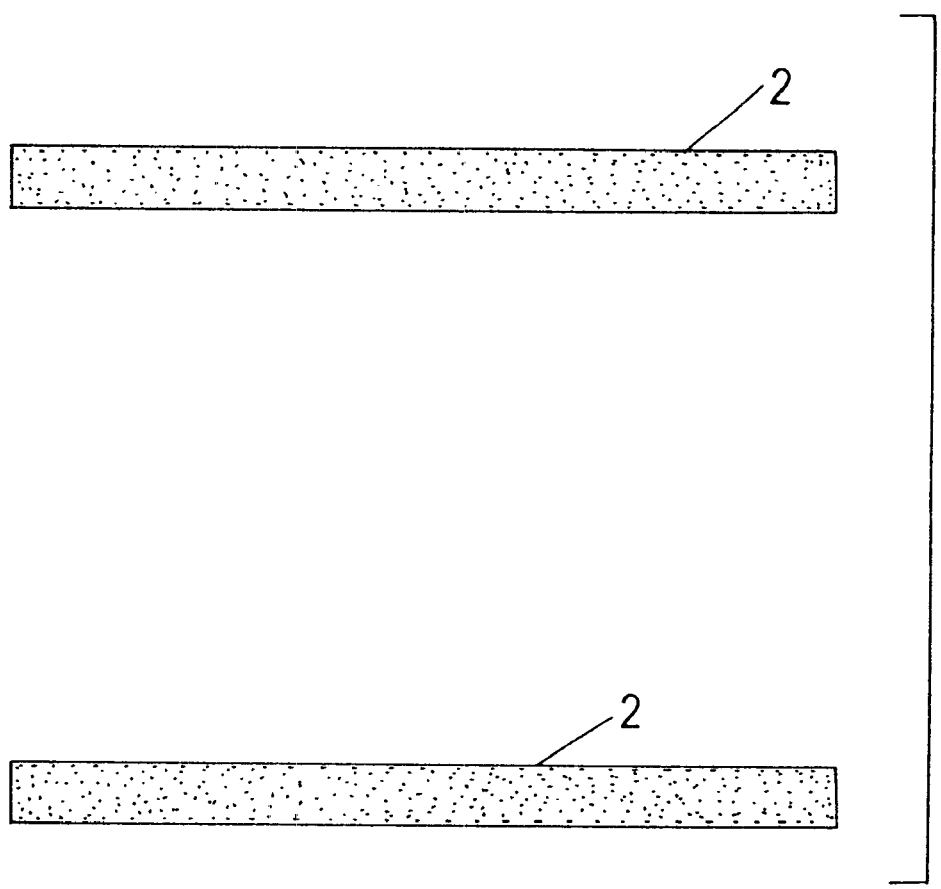
FIG. 2 is a view showing a manufacturing step of the liquid crystal display according to example 1 of the invention.
Figure 3:
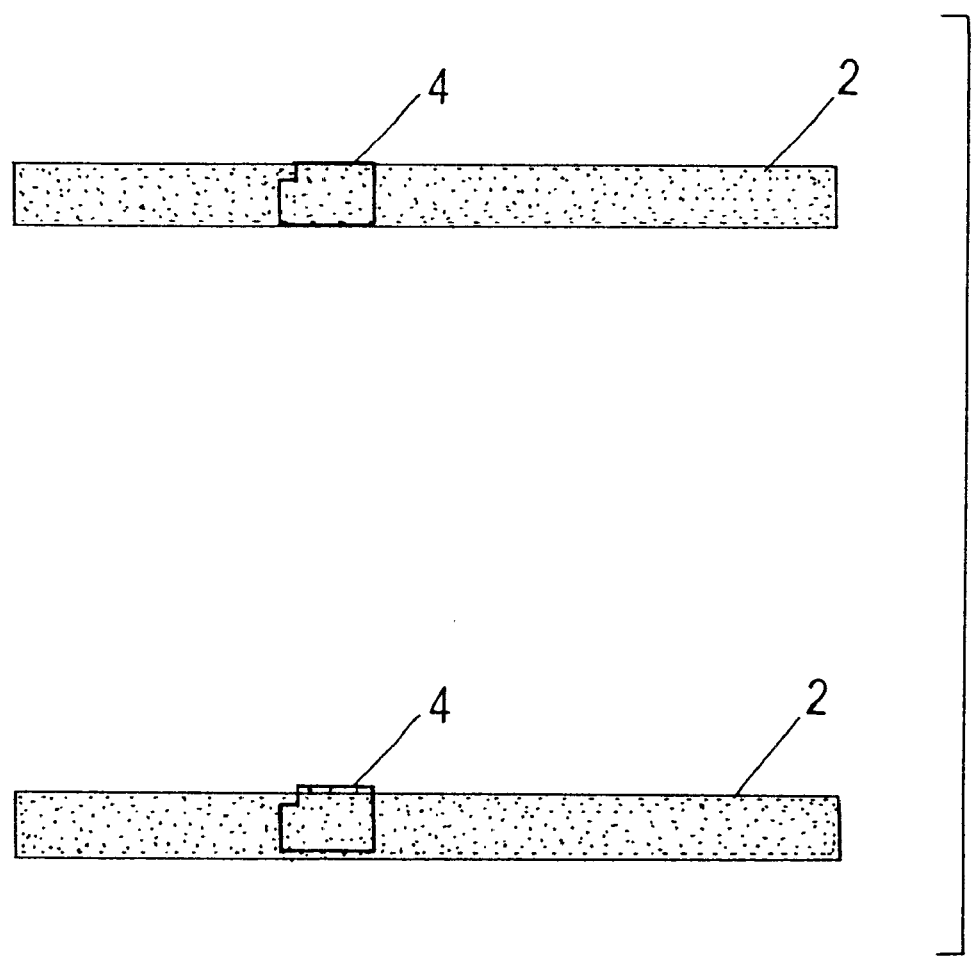
FIG. 3 is a view showing a manufacturing step of the liquid crystal display according to example 1 of the invention.

First, as shown in FIG. 2, the gate line 2 is formed on a glass substrate (not illustrated). Then, after forming a gate insulating film (not illustrated) on the gate line 2, the semiconductor thin film 4 is arranged on the region serving as the gate electrode on the gate line 2 by patterning the semiconductor thin film 4 forming the TFT, as shown in FIG. 3. This semiconductor thin film 4 is a multi-layer film formed by laminating an i-layer (numeral 5 in FIG. 8(*b*)) and an n-layer (numeral 6 in FIG. 8(*b*)) in order.

Figure 4:
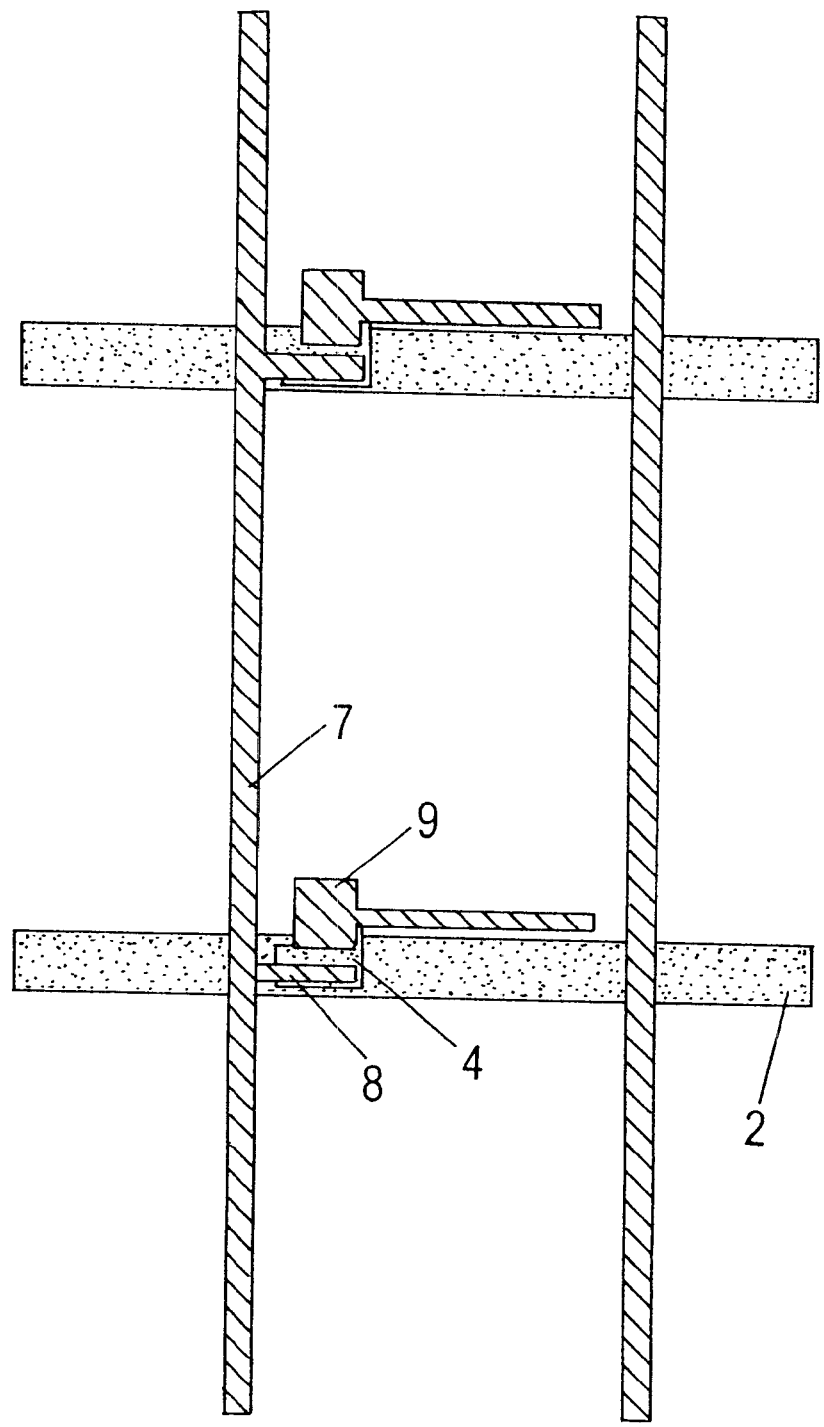
FIG. 4 is a view showing a manufacturing step of the liquid crystal display according to example 1 of the invention.

Thereafter, as shown in FIG. 4, the source line 7, the source electrode 8 and the drain electrode 9 are formed. The source line 7 is arranged in a direction crossing over the extending direction of the gate line 2, and the source electrode 8 being in electrical connection to the source line 7 is arranged on the semiconductor thin film 4 on the gate line 2. The drain electrode 9 is arranged to be opposite to the source electrode 8 through a region where a part of the drain electrode 9 becomes a channel of the semiconductor thin film 4. At the time of etching this drain electrode 9, the n-layer forming the semiconductor thin film 4 is simultaneously patterned, while the i-layer is left without being etched.

Figure 5:
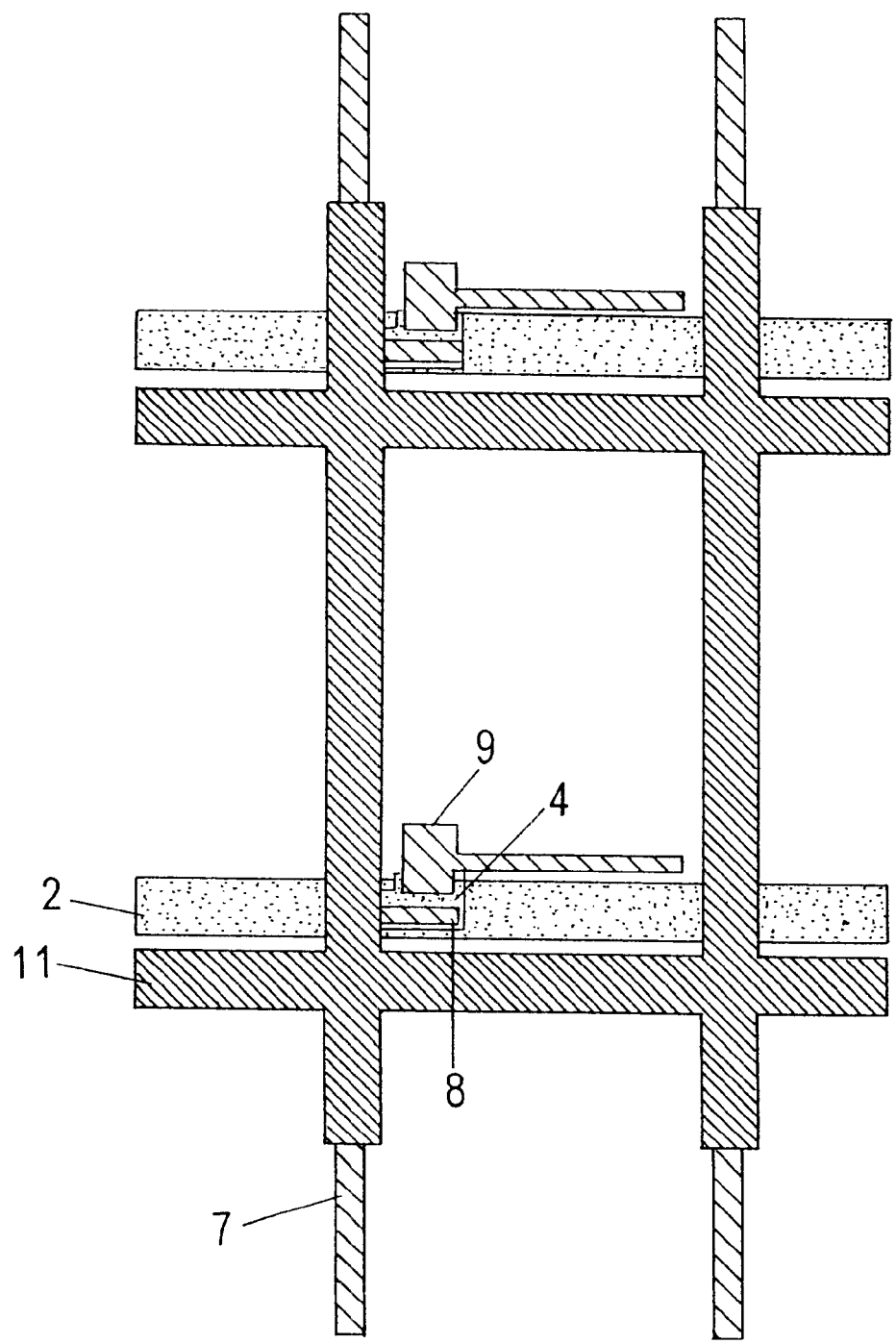
FIG. 5 is a view showing a manufacturing step of the liquid crystal display according to example 1 of the invention.

Then, after forming a source insulating film, as shown in FIG. 5, the Cs line 11 having a line component in the direction of arranging the source line 7 and a line component in the direction of the gate line 2 is formed by patterning in such a manner as to cover the source line 7.

Figure 6:
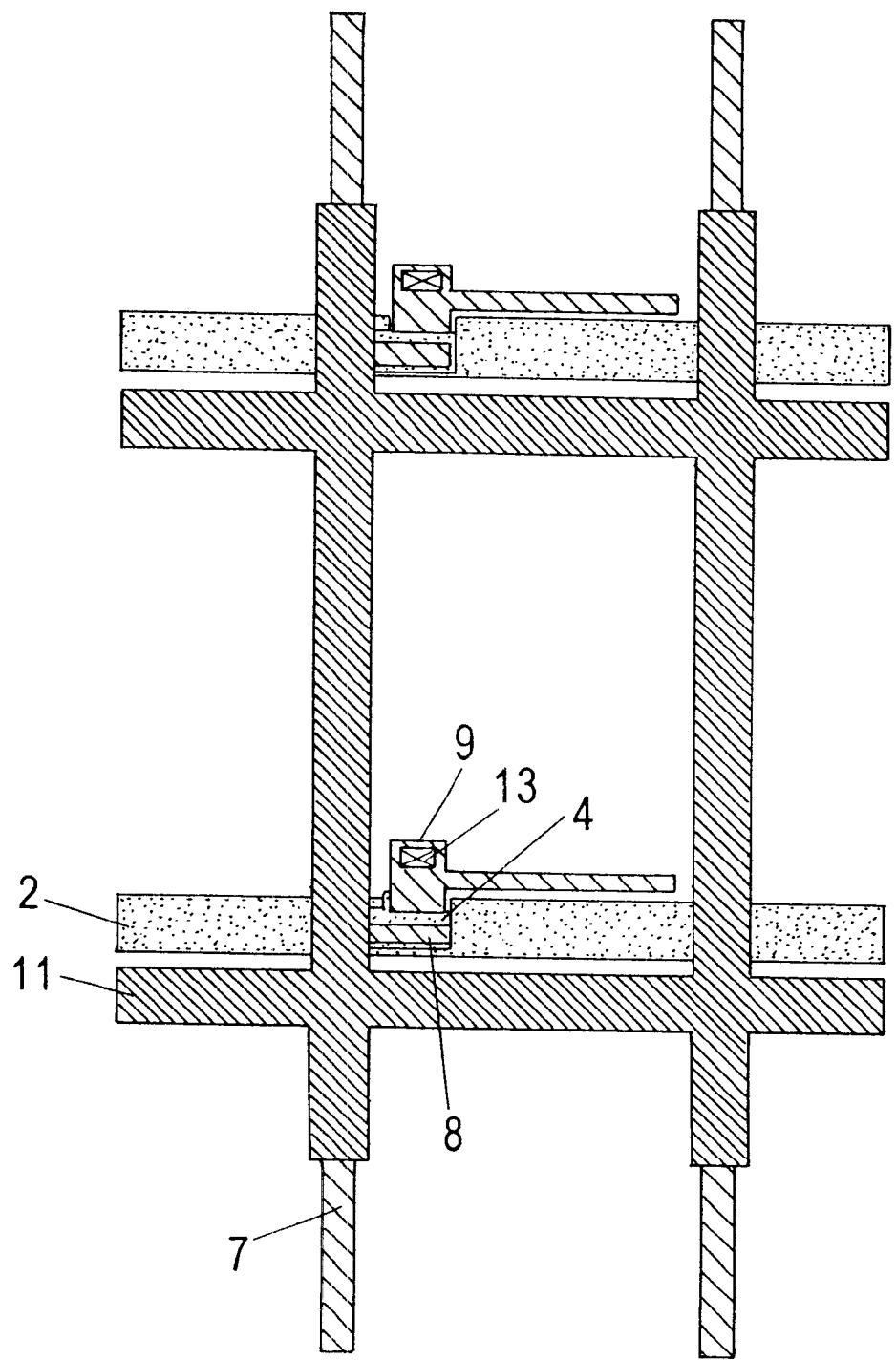
FIG. 6 is a view showing a manufacturing step of the liquid crystal display according to example 1 of the invention.

Thereafter, after forming a Cs insulating film on the Cs line 11, as shown in FIG. 6, the contact 13 is formed on the drain electrode 9.

Figure 7:
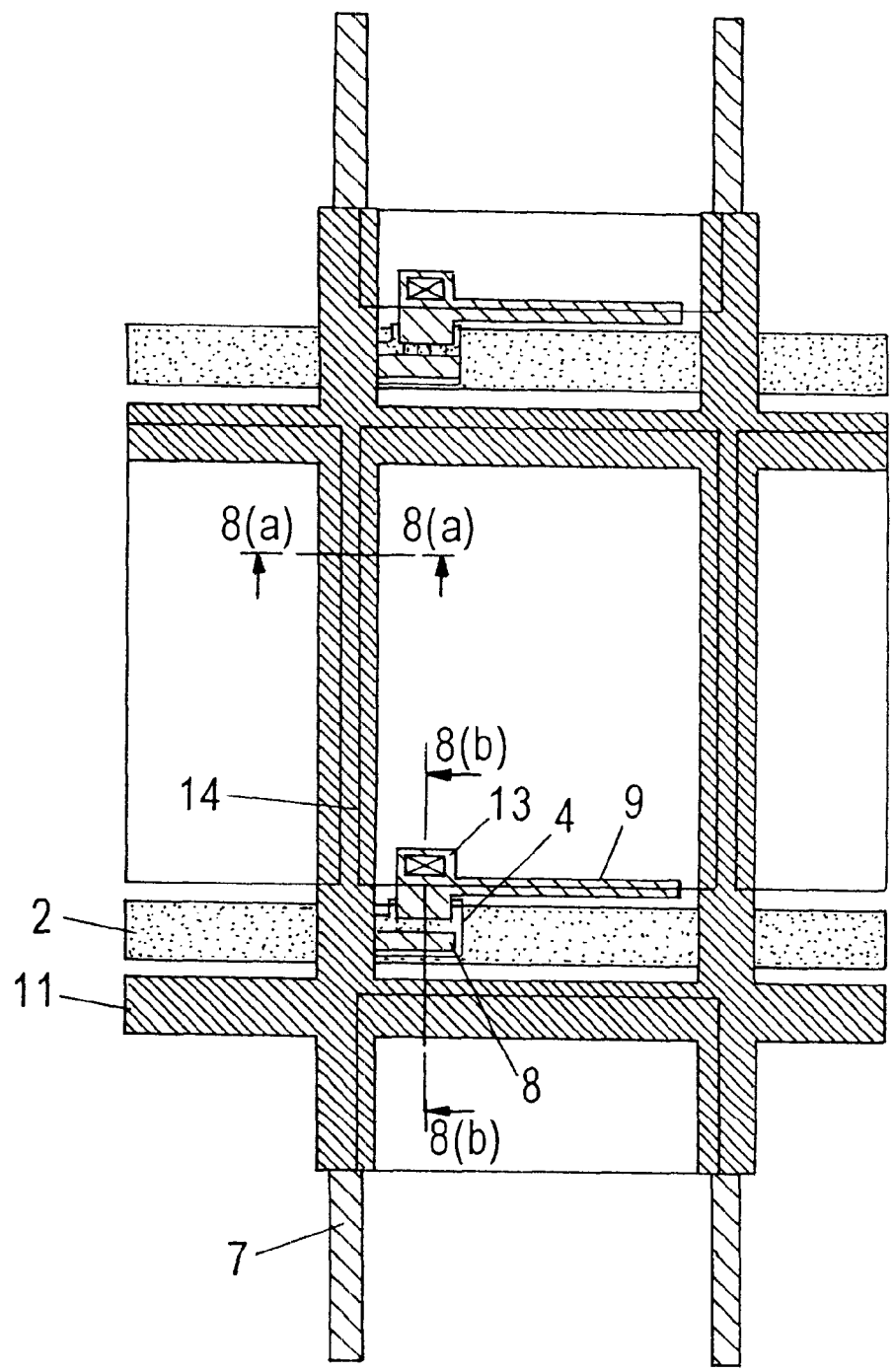
FIG. 7 is a view showing a manufacturing step of the liquid crystal display according to example 1 of the invention.

Further, as shown in FIG. 7, the pixel electrode 14 is arranged and formed in such a manner as to overlap the Cs line 11 and at least one part of the direction component of the source line 2. Thus, a structure having a storage capacitance between the Cs line 11 and the pixel electrode 14 is formed.

In this respect, the Cs line 11 is formed to be wider than the source line 7 so that a parasitic capacity Cdp generated between the source line 2 and the pixel electrode 14 is reduced.

Figure 8A:
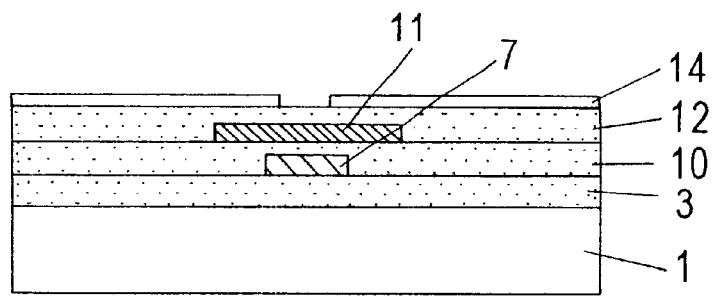
FIGS. 8(*a*) and (*b*) are sectional views of the liquid crystal display according to example 1 of the invention.
Figure 8B:
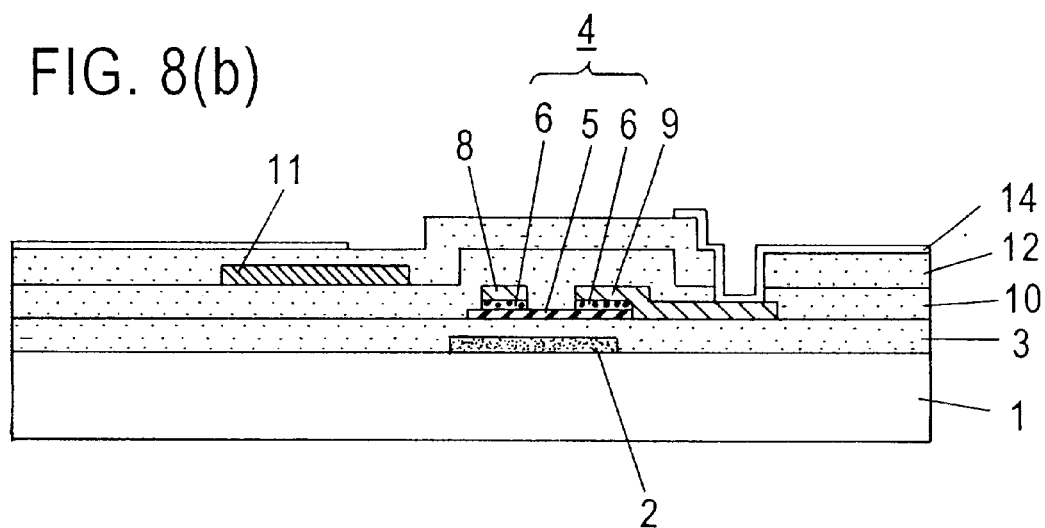

FIGS. 8(a) and (b) show sectional views of the A—A region and B—B region in FIG. 7, respectively. In the drawings, reference numeral 3 indicates the gate insulating film formed on the gate line 2, numerals 5 and 6 indicate respectively the i-layer and the n-layer forming the semiconductor thin film of the TFT, and numeral 12 is the Cs insulating film formed on the Cs line 11. Same reference numerals as those given for the above description are designated to the same or like parts.

It is understood from these drawings that the Cs line 11 wider than the source line 7 is formed on the source line 7 in such a manner as to cover the source line 7, and the pixel electrode 14 is arranged and formed in such a manner as to overlap partially the Cs line 11.

As described above, in the TFT of the TFT array according to example 1 of the invention, since the Cs line 11 is formed on the source line 2 through the source insulating film 10 and the pixel electrode 14 is formed on the Cs line through the Cs insulating film 12, the distance between the source line 7 and the pixel electrode 14 can be reduced, thereby increasing aperture ratio, which eventually results in improvement of brightness of LCD.

In the pixel section of the conventional liquid crystal display, because the Cs line is arranged under the source line and the parasitic capacity between the source line and the pixel electrode is large, there is a problem of increasing crosstalk. On the other hand, in the invention, since the Cs line is formed above the source line 7 in such a manner as to cover the source line 7 and the pixel electrode 14 is formed above the Cs line 11, the parasitic capacity Cdp between the source line 7 and the pixel electrode 14 can be reduced, which results in reduction of crosstalk.

Further, because the conventional Cs line is arranged in parallel to the gate line and the adjacent Cs line is connected at the end of panel, when trying to reduce width of electrode to improve aperture ratio, line resistance of the Cs line is increased resulting in increase of crosstalk. On the other hand, by employing the pixel structure shown in this example 1, i.e., by forming the Cs line 11 in the pixel into a ring (the Cs line 11 is mesh-like from the viewpoint of the entire panel) and connecting to the Cs line on the adjacent pixel, it is possible to reduce the Cs line resistance by not less than two figures. Accordingly, it becomes possible to get a liquid crystal display resistant to crosstalk.

Example 2

Example 2 of the invention is hereinafter described.

The manufacturing method of the pixel section according to this example 2 is same as that shown in example 1, as far as the manufacturing steps before forming a Cs line 11a are concerned.

Figure 9:
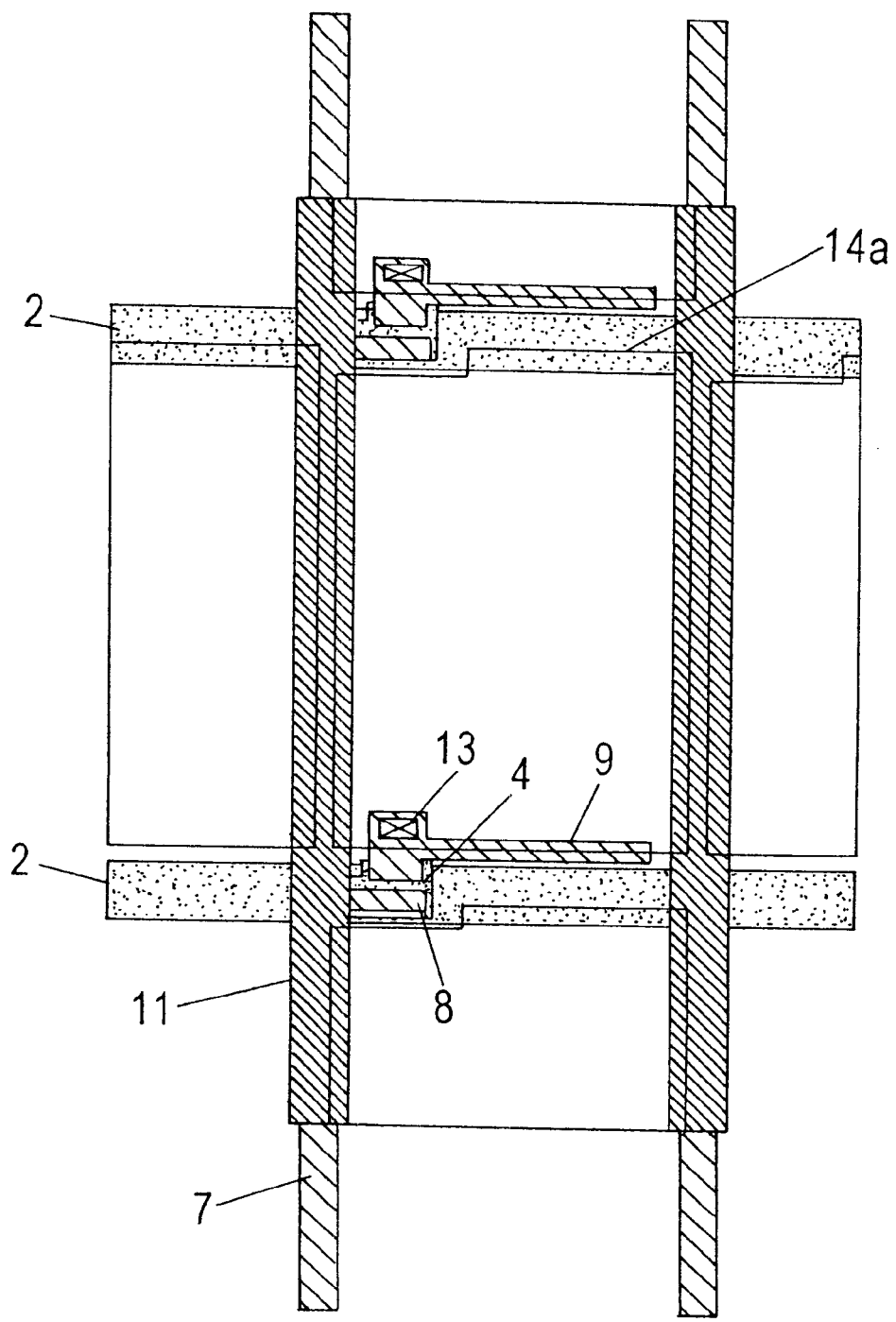
FIG. 9 is a plan view of a liquid crystal display according to example 2 of the invention.

As shown in FIG. 9, the Cs line 11a does not form a line section parallel to the gate line 2 in the pixel, but is arranged and formed above the source line 7 and an adjacent source line 7 through the source insulating film by overlapping a part of a pixel electrode 14a on the adjacent gate line 2. The Cs line 11a is not formed into a ring being different from example 1, but is arranged along the longitudinal direction (shorter direction than lateral direction) of liquid crystal panel. As a result, the line resistance can be restrained to be small as compared with the arrangement in lateral direction.

By forming the pixel electrode 14a shown in FIG. 9, the distance between the source line 7 and the pixel electrode 14a can be reduced thereby improving aperture ratio, and it becomes possible to improve brightness of the LCD.

Further, in the same manner as example 1, since the Cs line 11a is arranged and formed between the source line 7 and the pixel electrode 14a in such a manner as to cover the source line 7, the parasitic capacity Cdp can be reduced. Thus it becomes possible to reduce crosstalk as a matter of course.

Example 3

Example 3 of the invention is hereinafter described.

Figure 10:
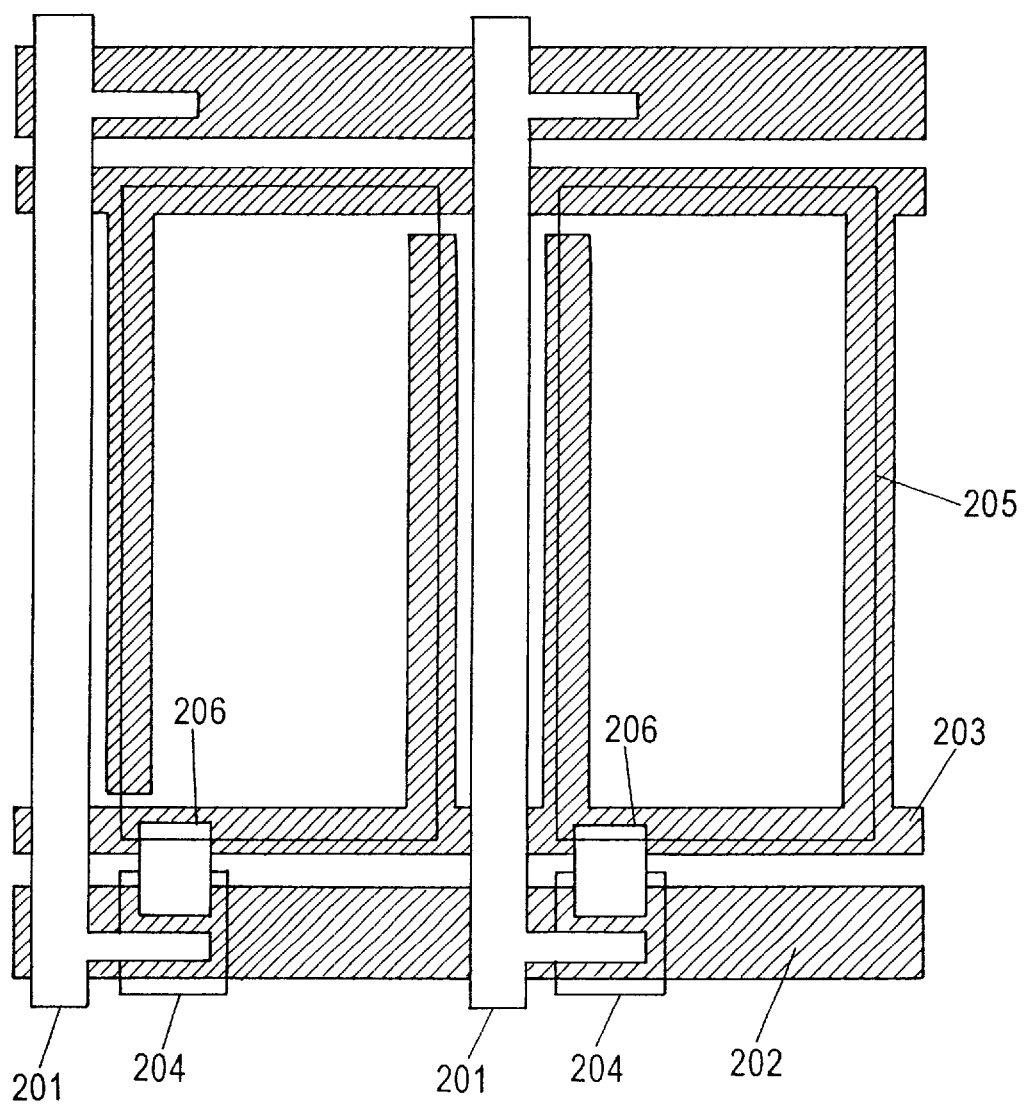
FIG. 10 is a plan view showing a pixel of the liquid crystal display according to example 3 of the invention.

FIG. 10 is a plan view showing a pixel of the liquid crystal display according to example 3 of the invention. The pixel shown in FIG. 10 is arranged forming a matrix and forms a display section.

In the drawing, reference numeral 201 indicates a source line, numeral 202 indicates a gate line arranged crossing over the source line 201, and numeral 203 is a Cs line forming a storage capacitance which is arranged along the gate line 202 and formed in the same manufacturing step as that of the gate line 202.

Numeral 204 is a semiconductor layer forming a channel of TFT, and numeral 205 is a pixel electrode forming a display section and is formed in a region defined by the source line 201 and the gate line 202. Numeral 206 is a drain electrode of TFT which is connected to the pixel electrode 205. The semiconductor 204, the source line 201, the gate line 202 and the drain electrode 206 form a TFT.

Figure 11:
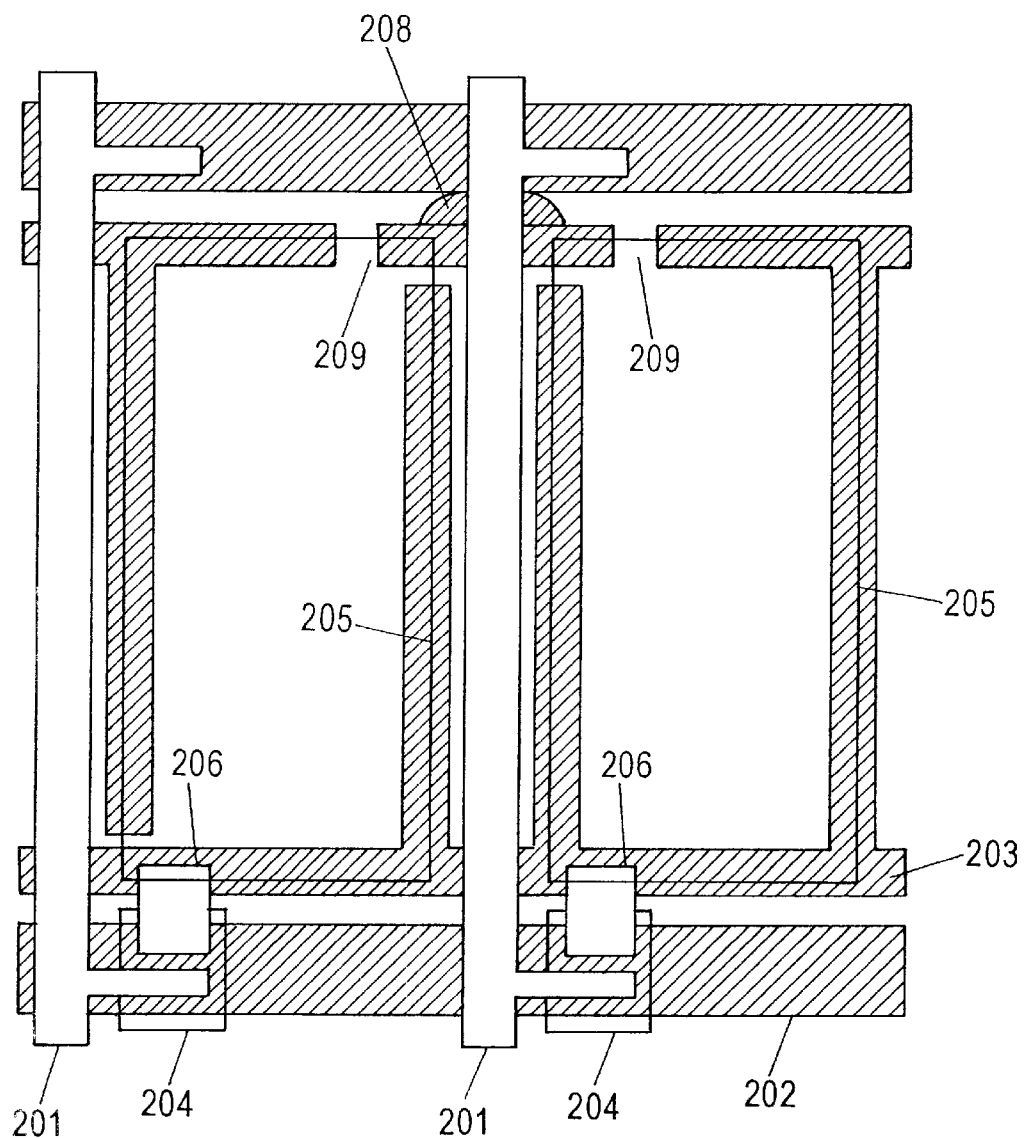
FIG. 11 is a plan view showing an interrupting point of the Cs line of the pixel of the liquid crystal display according to example 3 of the invention.

FIG. 11 is a plan view showing an interrupting point of the Cs line of the pixel of the liquid crystal display according to example 3 of the invention.

In the drawing, reference numerals 201 to 206 are the same as those in FIG. 10. Numeral 208 is a short circuit point between the gate line 202 and the Cs line 203, and the short circuit takes place under the source line 201. Numeral 209 is an interrupting point for interrupting the Cs line 203 on two sides of the short circuit point 208.

Figure 12:
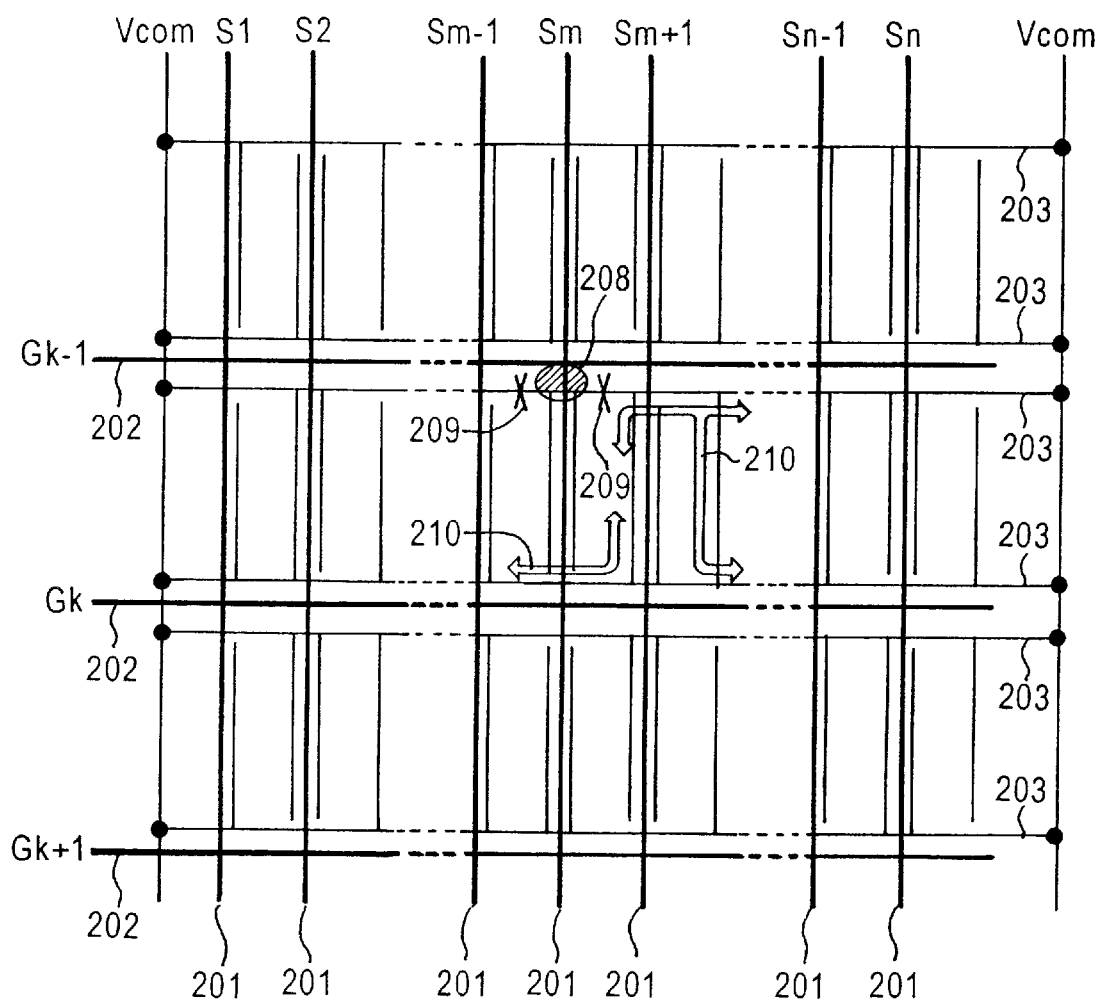
FIG. 12 is a schematic view showing a signal flow at the time of interrupting the Cs line of the pixel of the liquid crystal display according to example 3 of the invention.

FIG. 12 is a schematic view showing a signal flow at the time of interrupting point of the Cs line of the pixel of the liquid crystal display according to example 3 of the invention.

In the drawing, reference numerals 201 to 203, 208 and 209 are the same as those in FIG. 11. Numeral 210 indicates a signal flow of the Cs line 203. Sn indicates each individual source line, Gk indicates each individual gate line, and Vcom is a potential of the common electrode of the counter substrate. Potential of the Cs line is equal to the potential of the common electrode.

Figure 13A:
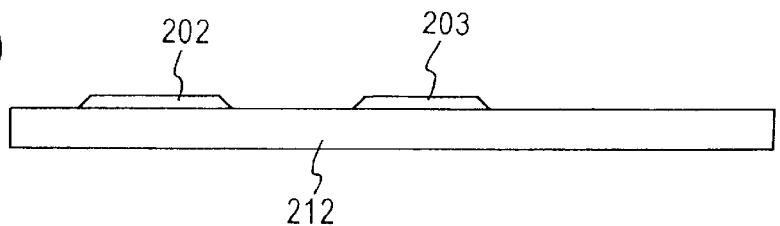
FIGS. 13(*a*), (*b*), (*c*), (*d*) and (*e*) are sectional views showing a manufacturing method of the array substrate according to example 3 of the invention.

FIGS. 13(a), (b), (c), (d) and (e) are sectional views showing a manufacturing method of the array substrate according to example 3 of the invention.

In the drawing, reference numerals 202 to 206 are the same as those in FIG. 10. Reference numeral 212 indicates a transparent substrate, numeral 213 indicates a gate insulating film, numeral 214 is a semiconductor layer doped with an impurity formed to make an ohmic contact with the source line 201 or with the drain electrode 206. Numerals 214a and 214b are respectively a source region and a drain region for making an ohmic contact with the source line 201 or with the drain electrode 206. Numeral 215 is a protective film formed to protect the semiconductor layer 204.

As shown in FIG. 10, the array substrate forming the liquid crystal display according to the invention is provided with two Cs lines 203, and these Cs lines 203 are constructed to have a line section for shading a leak light from the gap between the source line 201 and the pixel electrode 205. In some pixels, the two Cs lines 203 are separated, while in other pixels, the two Cs lines 203 are connected to each other at either line section provided to shade the leak light from the gap between the source line 201 and the pixel electrode 205. Further, the two Cs lines 203 arranged along the gate line 202 are connected to each other on both sides of the image plane serving as a display section as shown in FIG. 12.

In the liquid crystal display of above construction, when the gate line 202 and the Cs lines 203 short-circuit under the source line 201 as shown in FIG. 11, the short circuit point 208 is electrically interrupted by interrupting the two interrupting points 209 with YAG laser, for example. The two Cs lines 203 are separated by the interruption. However, as indicated by the signal flow 210 in FIG. 12, since the two Cs lines are connected to each other in some pixel, the signal supplied to the Cs lines 203 are supplied not only from one side of the image plane but also from two sides, and any signal delay does not occur.

Further, even when the Cs lines 203 are interrupted, storage capacitance value of the pixel is same as that of normal pixel. As a result, fluctuation of pixel potential due to the potential fluctuation ΔVgd of the drain electrode and the electric charge are not different from normal pixel, and any flicker or printing are not visually recognized at all.

Then, a manufacturing method of the array substrate of the liquid crystal display according to the invention is hereinafter described with reference to FIG. 13.

Figure 13B:
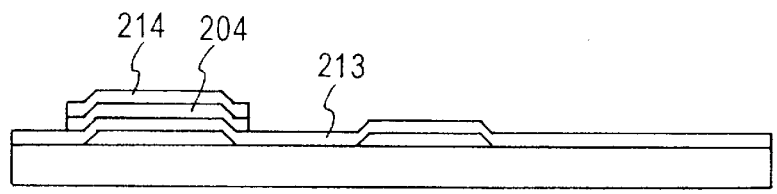

First, as shown in FIG. 13(a), for example, Cr is formed into the gate line 202 and the Cs line 203 on the transparent substrate 201 in one process. Then, as shown in FIG. 13(b), for example, SiN is formed into the gate insulating film 213, amorphous Si (hereinafter referred to as a-Si) is formed into the semiconductor layer 204 to serve as a channel, and n+a-Si doped with P ion is formed into the semiconductor layer 214 doped with impurity ion to make an ohmic contact with the line metal. These films and layers are continuously formed, and then, except the portion to be the TFT, the n+a-Si and a-Si are removed.

Figure 13C:
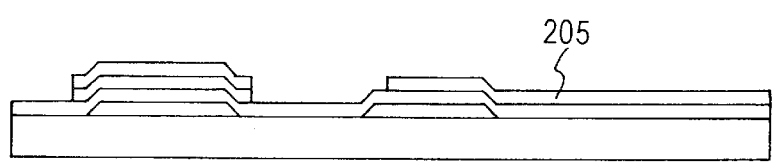
Figure 13D:
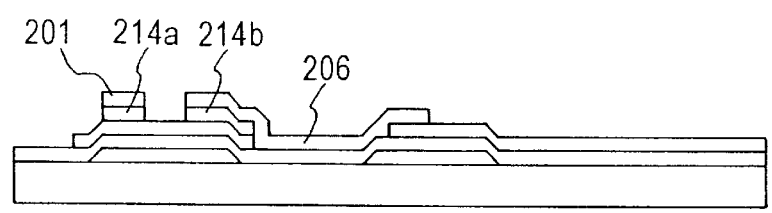
Figure 13E:
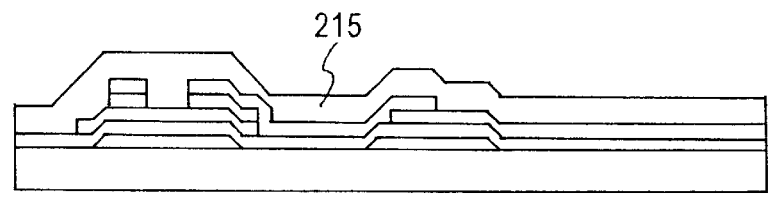
Figure 14:
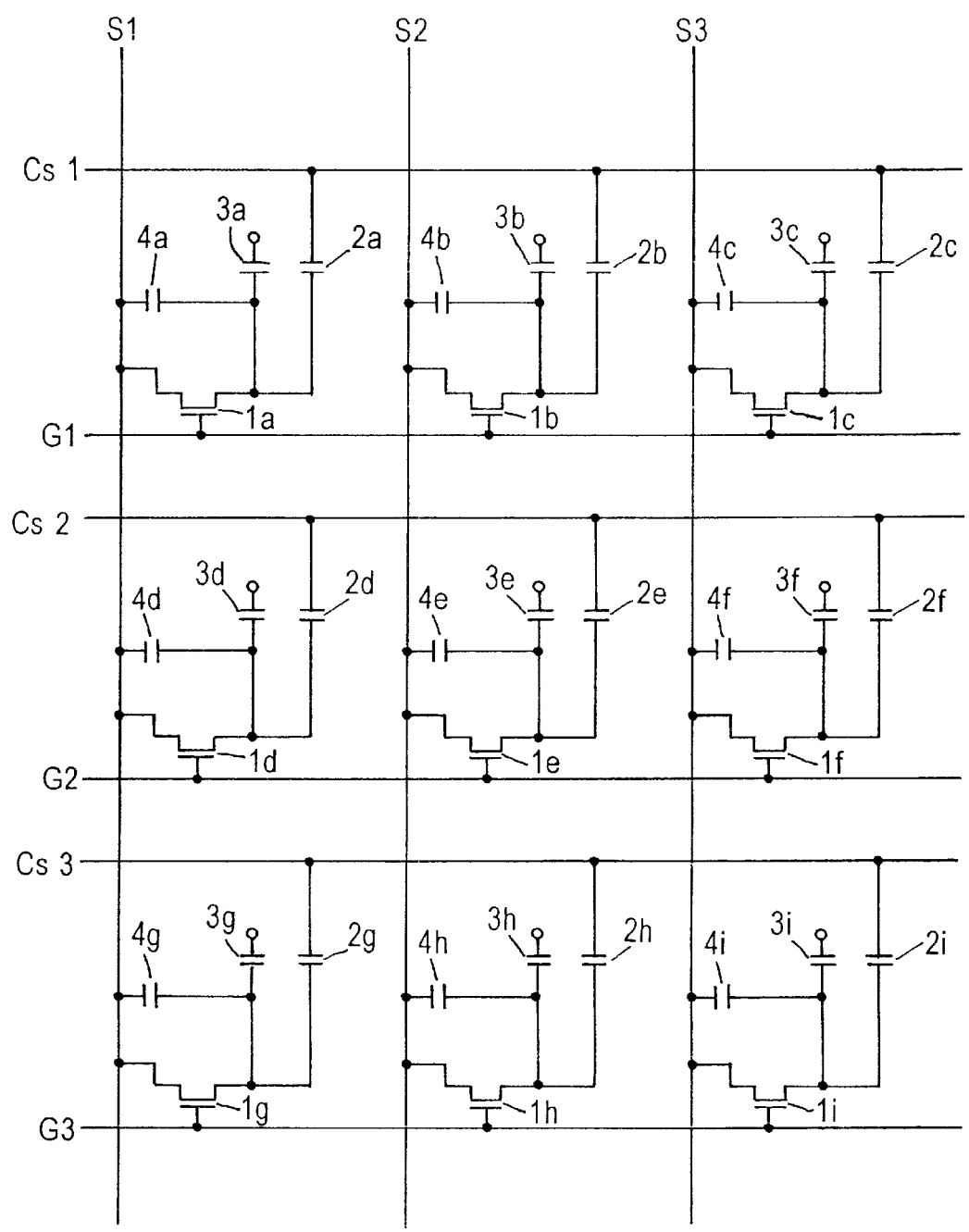
FIG. 14 is a schematic circuit diagram of a basic liquid crystal display.
Figure 15:
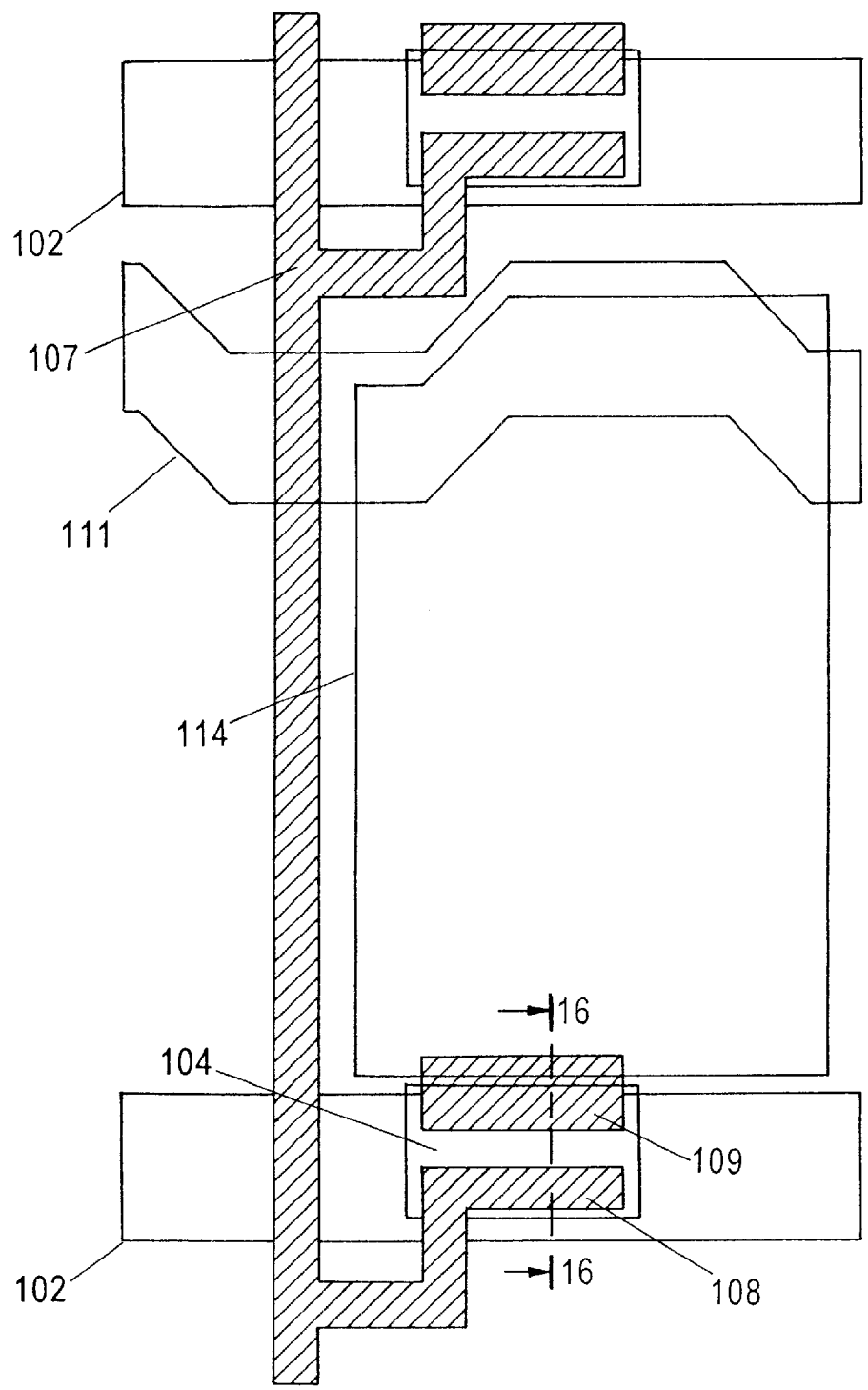
FIG. 15 is a plan view of the liquid crystal display according to the prior art.
Figure 16:
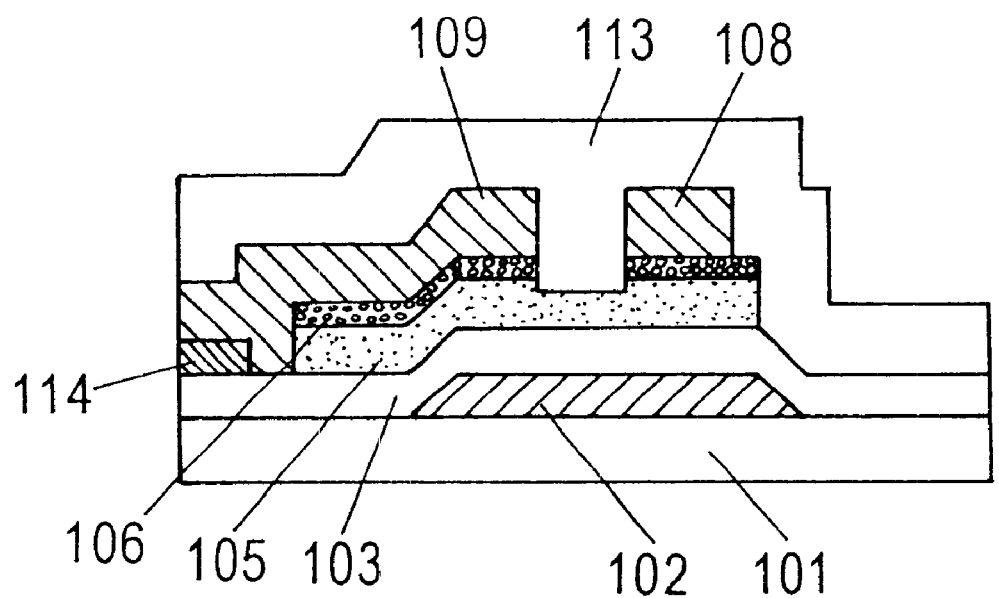
FIG. 16 is a sectional view of the liquid crystal display according to the prior art.
Figure 17A:
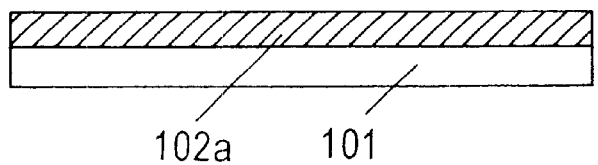
FIGS. 17(*a*), (*b*), (*c*), (*d*) and (*e*) are sectional views showing manufacturing steps of the liquid crystal display according to the prior art.
Figure 17B:
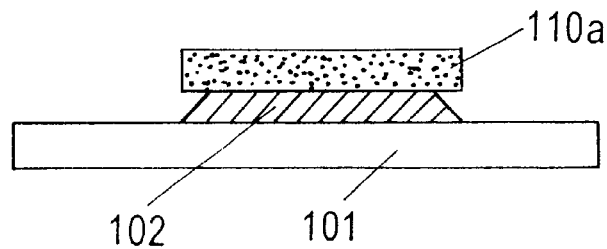
Figure 17C:
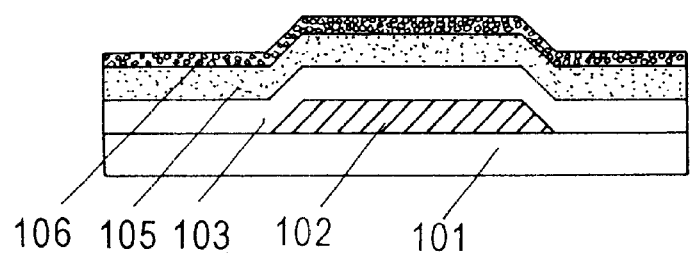
Figure 17D:
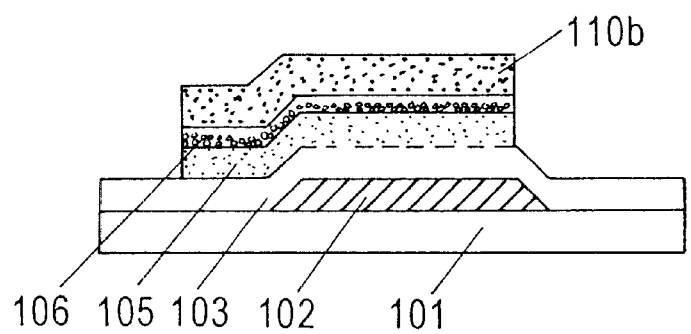
Figure 17E:
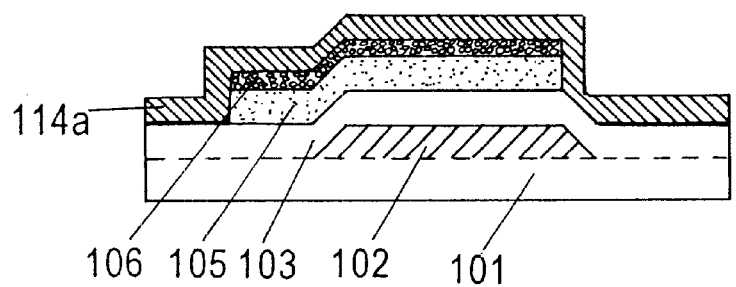
Figure 18A:
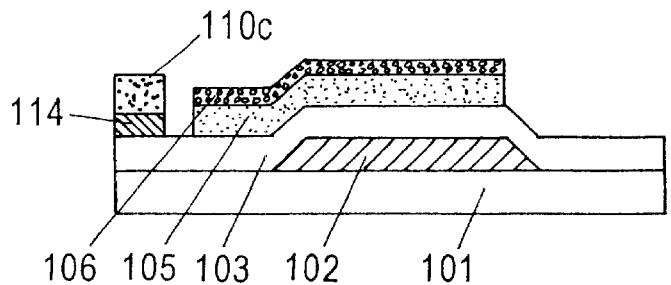
FIGS. 18(*a*), (*b*) and (*c*) are sectional views showing manufacturing steps of the liquid crystal display according to the prior art.
Figure 18B:
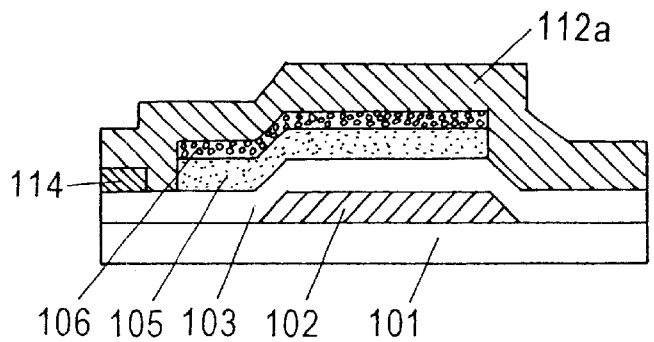
Figure 18C:
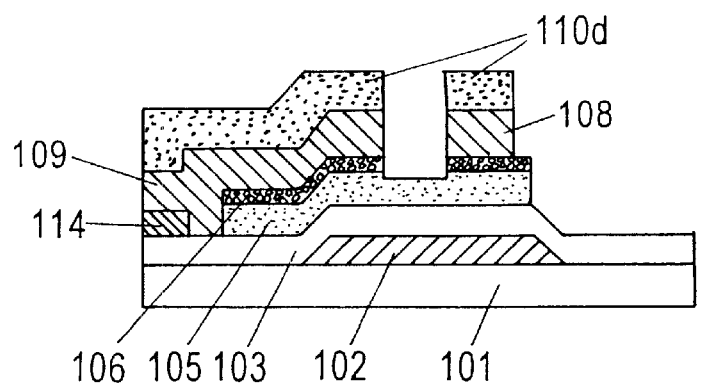
Figure 19:
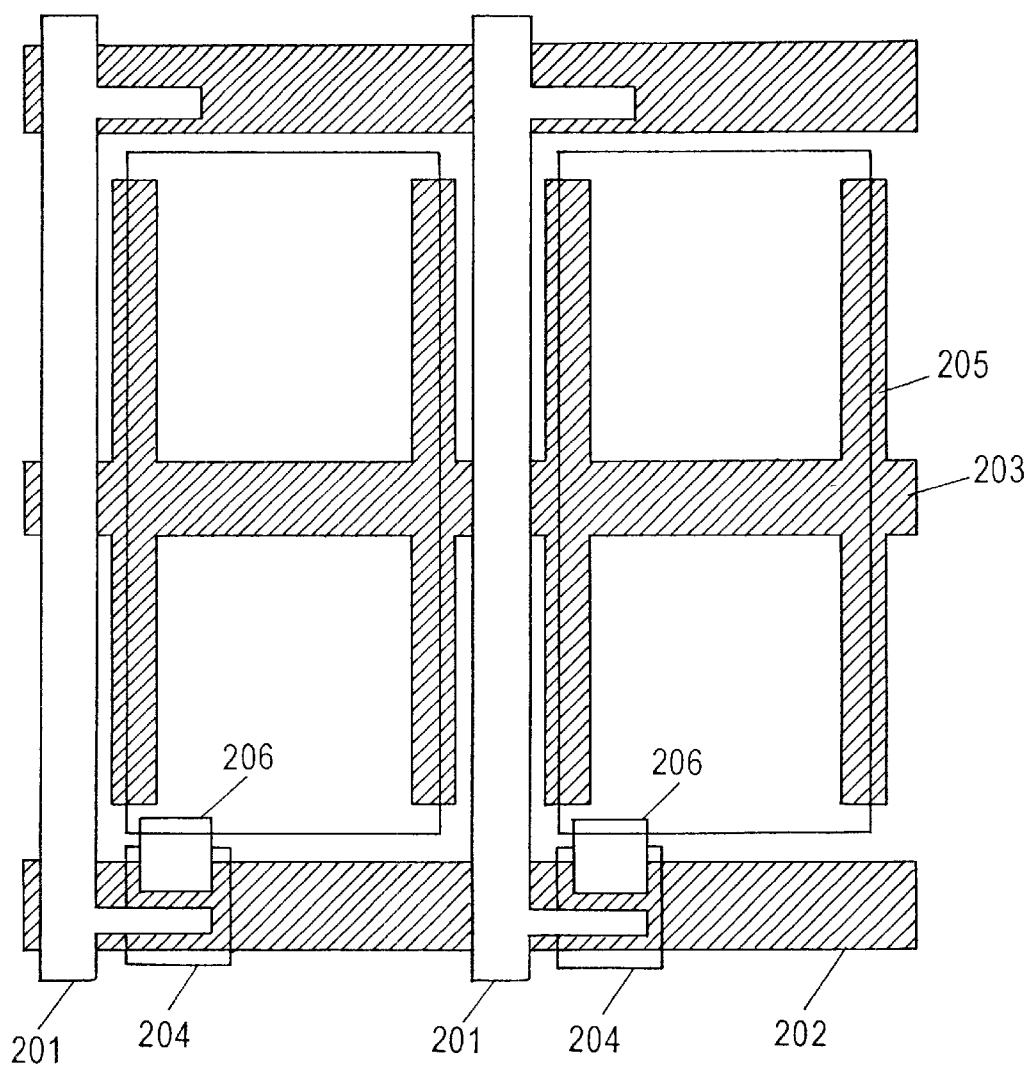
FIG. 19 is a plan view showing a pixel of the liquid crystal display according to the prior art.
Figure 20:
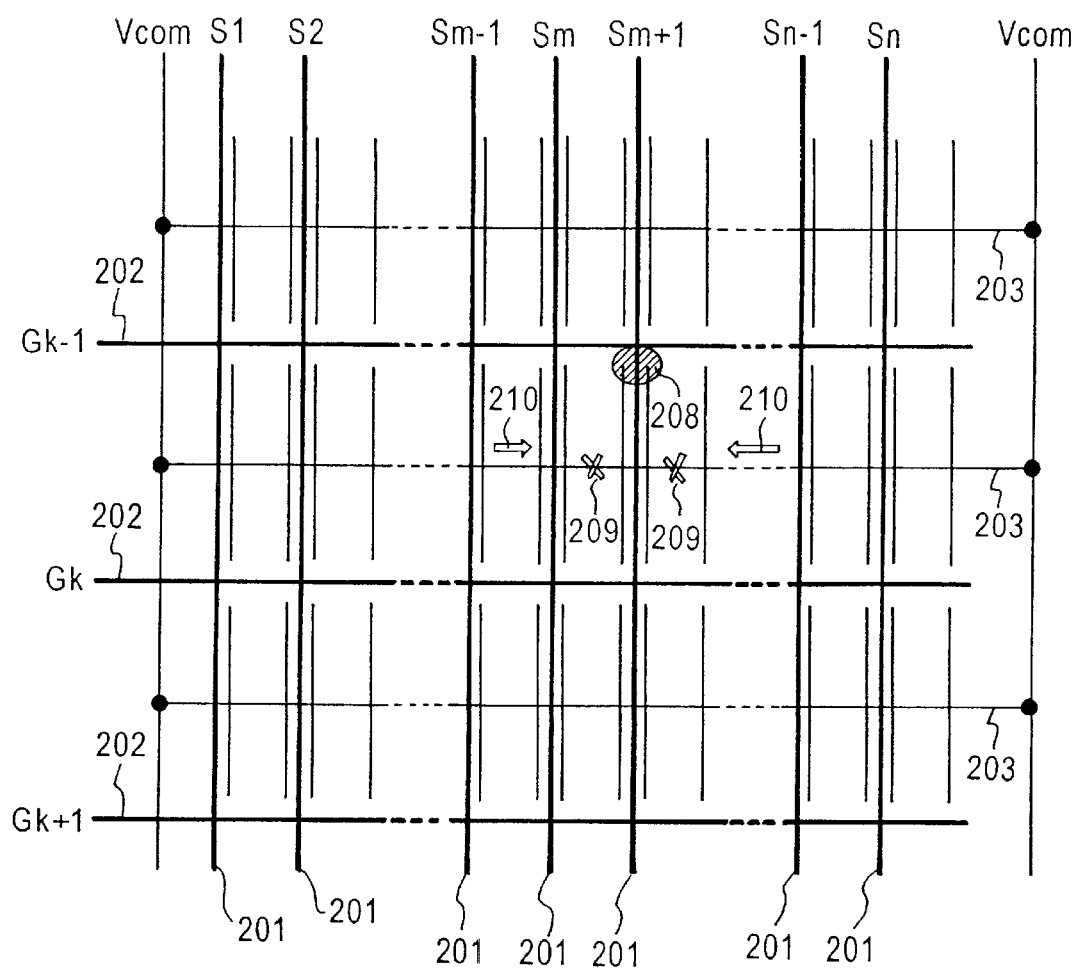
FIG. 20 is a schematic view showing a signal flow at the time of interrupting the Cs line of the pixel of the liquid crystal display according to the prior art.

Subsequently, as shown in FIG. 13(c), for example, ITO is formed into the pixel electrode 205, and thereafter, as shown in FIG. 13(d), for example, Cr is formed into the source line 201 and the drain electrode 206. And by removing unnecessary n+a-Si, the source region 214a for making an ohmic contact with the source line 201 and the drain region 214 for making an ohmic contact with the drain electrode 206 are formed. Then, as shown in FIG. 13(e), to protect the channel portion from which n+a-Si has been removed, for example, SiN is formed into the protective film 215. By removing the protective film from the terminal portion, an array substrate of the liquid crystal display according to the invention is achieved.

In addition, it is preferable that in the above construction, the two Cs lines 203 are connected to each other at any optional pixel and the connection points are provided at not less than two pixels.

It is also preferable that the pixels for connecting the two Cs lines 203 are disposed with equal distances.

Though the positions for connecting the two Cs lines 203 for each gate line 202 are changed, the same advantage is performed without changing the positions.

Though a channel H type TFT of reverse stagger structure is described in this example, the same advantage is performed also by channel protection type TFT, TFT of forward stagger structure and TFT of co-planer structure.

Though a-Si is used to form the semiconductor layer 204 to serve as a channel, it is also preferable that a polycrystalline Si is used.

Though Cr is used to form the gate line 202 and the source line 201, it is also preferable to use any other metal such as Al, Cu, Ti, Ta, Mo, Al—Si, Al—Si—Cu, Al—Nd, Al—N or laminate thereof.

What is claimed is:

1. A liquid crystal display comprising a TFT array substrate for use in matrix type display; said TFT array substrate including a plurality of gate lines arranged on an insulating substrate with certain distances, a plurality of source lines crossing over said gate lines, and thin film transistors provided at crossover sections between said gate lines and said source lines, and having pixel electrodes connected to drain electrodes forming said thin film transistors, and storage capacitance electrode lines each forming a storage capacitance by holding an insulating film between the storage capacitance electrode lines and pixel electrodes; wherein said storage capacitance electrode lines are arranged in such a manner as to overlap an upper part of said source lines, and the pixel electrodes are arranged in such a manner as to overlap an upper part of said storage capacitance electrode lines.

2. The liquid crystal display according to claim 1, wherein the pixel electrodes are arranged and formed in such a manner as to overlap an upper layer of the storage capacitance electrode lines.

3. The liquid crystal display according to claim 1, wherein the pixel electrodes and the gate lines overlaps partially each other.

4. The liquid crystal display according to claim 1, wherein the storage capacitance electrode lines are formed into a mesh-like structure having line components in the wiring direction of the source lines and the gate lines.

5. A liquid crystal display comprising a TFT array substrate for use in matrix type display; said TFT array substrate including a plurality of gate lines arranged on an insulating substrate with certain distances, a plurality of source lines crossing over said gate lines, and thin film transistors provided at crossover sections between said gate lines and said source lines, and having pixel electrodes connected to drain electrodes forming said thin film transistors, and storage capacitance electrode lines each forming a storage capacitance by holding an insulating film between the storage capacitance electrode lines and pixel electrodes; wherein, a line component in wiring direction of the source lines among the storage capacitance electrode lines is formed to be wider than said source lines in such a manner as to cover said source lines.

6. A liquid crystal display comprising a TFT array substrate for use in matrix type display; said TFT array substrate including a plurality of gate lines arranged on an insulating substrate with certain distances, a plurality of source lines crossing over said gate lines, and thin film transistors provided at crossover sections between said gate lines and said source lines, and having pixel electrodes connected to drain electrodes forming said thin film transistors, and storage capacitance electrode lines each forming a storage capacitance by holding an insulating film between the storage capacitance electrode lines and pixel electrodes; wherein the storage capacitance electrode lines are arranged in such a manner as to extend in one direction along the source lines and formed to be wider than said source lines in such a manner as to cover said source lines, and the pixel electrodes are arranged and formed in such a manner as to overlap the upper layer of said storage capacitance electrode lines.

* * * * *

UNITED STATES PATENT AND TRADEMARK OFFICE
CERTIFICATE OF CORRECTION

PATENT NO. : 6,404,465 B1  Page 1 of 1
DATED : June 11, 2002
INVENTOR(S) : Akio Nakayama It is certified that error appears in the above-identified patent and that said Letters Patent is hereby corrected as shown below:

Title page,
Item [75] Inventors, change "Akio Nakayama; Yoshinori Numano, both of Kumamoto (JP)" to -- Akio Nakayama, of Kumamoto (JP) --

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,404,465 B1
DATED          : June 11, 2002
INVENTOR(S)    : Akio Nakayama It is certified that error appears in the above-identified patent and that said Letters Patent is hereby corrected as shown below:

<u>Title page,</u>
Item [75] Inventors, change "Akio Nakayama; Yoshinori Numano, both of Kumamoto (JP)" to -- Akio Nakayama, of Kumamoto (JP) --

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,404,465 B1 Page 1 of 1
DATED : June 11, 2002
INVENTOR(S) : Akio Nakayama It is certified that error appears in the above-identified patent and that said Letters Patent is hereby corrected as shown below:

Title page, Item [54] and Column 1, lines 1-5,
Change "LIQUID CRYSTAL DISPLAY WHEREIN STORAGE ELECTRODES OVERLAP UPPER PART OF SOURCE LINES AND PIZEL ELECTRODES OVERLAP UPPER PART OF STORAGE ELECTRODES" to -- LIQUID CRYSTAL DISPLAY WITH TFT ARRAY SUBSTRATE AND MANUFACTURING METHOD THEREOF --

Signed and Sealed this

Third Day of June, 2003

JAMES E. ROGAN
*Director of the United States Patent and Trademark Office*